(12) United States Patent
Torrini et al.

(10) Patent No.: US 11,735,177 B2
(45) Date of Patent: Aug. 22, 2023

(54) KEYWORD SPOTTING USING MACHINE LEARNING

(71) Applicant: Silicon Laboratories Inc., Austin, TX (US)

(72) Inventors: Antonio Torrini, Austin, TX (US); Ramin Khoini-Poorfard, Austin, TX (US); Sebastian Ahmed, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 287 days.

(21) Appl. No.: 16/711,889

(22) Filed: Dec. 12, 2019

(65) Prior Publication Data

US 2021/0183380 A1   Jun. 17, 2021

(51) Int. Cl.
| | | |
|---|---|---|
| *G10L 15/22* | (2006.01) | |
| *G10L 25/18* | (2013.01) | |
| *G10L 15/16* | (2006.01) | |
| *G10L 25/78* | (2013.01) | |
| *G10L 15/06* | (2013.01) | |
| *G06N 3/08* | (2023.01) | |
| *G10L 25/24* | (2013.01) | |
| *G06N 3/045* | (2023.01) | |
| *G10L 15/08* | (2006.01) | |

(52) U.S. Cl.
CPC .............. *G10L 15/22* (2013.01); *G06N 3/045* (2023.01); *G06N 3/08* (2013.01); *G10L 15/063* (2013.01); *G10L 15/16* (2013.01); *G10L 25/18* (2013.01); *G10L 25/24* (2013.01); *G10L 25/78* (2013.01); *G10L 2015/088* (2013.01); *G10L 2015/223* (2013.01)

(58) Field of Classification Search
CPC ....... G10L 15/22; G10L 15/063; G10L 15/16; G10L 25/18; G10L 25/24; G10L 25/78; G10L 2015/088; G10L 2015/223; G06N 3/0454; G06N 3/08
See application file for complete search history.

(56) References Cited

U.S. PATENT DOCUMENTS

| | | | |
|---|---|---|---|
| 9,858,340 B1* | 1/2018 | Frey | G06K 9/6296 |
| 10,726,830 B1* | 7/2020 | Mandal | G10L 15/16 |
| 10,897,663 B1* | 1/2021 | Kemmerer | G10K 11/17855 |
| 2006/0146758 A1* | 7/2006 | Harris | H04J 13/0048 370/335 |
| 2012/0066526 A1* | 3/2012 | Salsbery | G06F 1/3203 713/320 |
| 2014/0149118 A1* | 5/2014 | Lee | G10L 15/22 704/251 |
| 2015/0326985 A1* | 11/2015 | Priyantha | G06V 30/1801 381/56 |

(Continued)

*Primary Examiner* — Bhavesh M Mehta
*Assistant Examiner* — Edward Tracy, Jr.
(74) *Attorney, Agent, or Firm* — Nields, Lemack & Frame, LLC (57) ABSTRACT

A system and method of keyword spotting using two neural networks is disclosed. The system is in sleep mode most of the time, and wakes up periodically. Upon waking, a limited duration of audio is examined. This may be performed using an auxiliary neural network. If any audio activity is detected in this duration, the system fully wakes and examines a longer duration of audio for keywords. The keyword spotting is also performed by the main neural network, which may be a convolutional neural network (CNN).

18 Claims, 9 Drawing Sheets

(56) References Cited

U.S. PATENT DOCUMENTS

| | | | |
|---|---|---|---|
| 2016/0358069 A1* | 12/2016 | Brothers | G06F 7/764 |
| 2017/0064461 A1* | 3/2017 | Thomsen | H04R 25/305 |
| 2017/0316792 A1* | 11/2017 | Chaudhuri | G10L 25/93 |
| 2018/0224923 A1* | 8/2018 | Elias | G06F 1/3296 |
| 2019/0043507 A1* | 2/2019 | Huang | G10L 17/00 |
| 2020/0143802 A1* | 5/2020 | Newell | G06N 3/04 |
| 2020/0296236 A1* | 9/2020 | Kobayashi | G10L 15/22 |
| 2021/0110830 A1* | 4/2021 | Yang | G10L 25/78 |
| 2022/0223150 A1* | 7/2022 | Li | G10L 15/08 |

* cited by examiner

KEYWORD SPOTTING USING MACHINE LEARNING

This disclosure describes systems and methods for detecting keywords using Machine Learning.

BACKGROUND

Keyword spotting is an application that is both useful and common for IOT devices that can recognize, interpret and act upon voice commands.

The IOT device may have an audio channel that includes a microphone, an analog to digital converter (ADC) and some additional processing. Under typical conditions, the audio channel is always active and ready to receive and process commands. This behavior is desirable to ensure system responsiveness and accuracy.

However, this behavior also results in increased power consumption. This may make this approach unsuitable for battery powered devices, specifically those devices that have limited battery power, such as those that utilize only one AA or AAA battery.

Therefore, it would be advantageous if there were a way to perform keyword spotting without requiring that the audio channel is always active. Further, it would be beneficial if this approach was as accurate as the previous technique. Further, it would be beneficial if such as approach resulted in minimal loss of accuracy.

SUMMARY

A system and method of keyword spotting using two neural networks is disclosed. The system is in sleep mode most of the time, and wakes up periodically. Upon waking, a limited duration of audio is examined. This may be performed using an auxiliary neural network. If any audio activity is detected in this duration, the system fully wakes and examines a longer duration of audio for keywords. The keyword spotting is also performed by the main neural network, which may be a convolutional neural network (CNN).

In one embodiment, a device for detecting one or a plurality of keywords is disclosed. The device comprises a microphone; an analog to digital converter (ADC) in communication with an output of the microphone to receive audio signals; a processing unit in communication with an output of the ADC to receive digitized audio samples from the ADC; a memory device, comprising instructions, which when executed by the processing unit, enable the device to: wake up from a sleep mode; receive the plurality of digitized audio samples from the ADC; use a plurality of digitized audio samples as an input to an auxiliary neural network, wherein the auxiliary neural network determines where any audio activity is detected; and return to sleep mode if no audio activity is detected; and capture a plurality of additional digitized audio samples; use the plurality of additional digitized audio samples to create a spectrogram; provide the spectrogram as an input to a main neural network, wherein the main neural network comprises a plurality of outputs, where each output is a confidence level that the spectrogram contains a respective keyword. In certain embodiments, the main neural network is a convolutional neural network, comprising a convolutional stage and a fully connected stage, wherein the convolutional stage comprises one or more convolutional layers and the fully connected stage comprises one or more fully connected layers. In some embodiments, the auxiliary neural network comprises a fully connected neural network. In certain embodiments, the processing unit performs a function or activity based on the outputs from the main neural network. In some embodiments, if audio activity is not detected, the processing unit returns to sleep mode in less than 1 milliseconds. In certain embodiments, the device comprises a wakeup timer, and the processing unit executes the instructions each time the wakeup timer expires. The wakeup timer may be set to a value between 25 and 250 milliseconds. In certain embodiments, the instructions to create the spectrogram enable the processing unit to: bin the plurality of additional digitized audio samples into one or more segments; perform a fast Fourier transform (FFT) of each of the one or more segments; perform Mel-cepstral conversion of the FFT for each segment to obtain Mel-cepstral information; and combine Mel-cepstral information from each segment to form the spectrogram. In other embodiments, the instructions to create the spectrogram enable the processing unit to: bin the plurality of additional digitized audio samples into one or more segments; perform a fast Fourier transform (FFT) of each of the one or more segments; perform averaging of the FFT for each segment to obtain spectral information; and combine spectral information from each segment to form the spectrogram. In certain embodiments, plurality of digitized audio samples comprises between 16 and 64 digitized audio samples. In certain embodiments, the plurality of additional digitized audio samples comprises at least 1000 digitized audio samples. In certain embodiments, the main neural network is trained using spectrograms containing keywords and truncated versions of the spectrograms.

According to another embodiment, a software program, disposed on a non-transitory storage media, is disclosed. The software program, when executed by a processing unit disposed on a device having a microphone and an analog to digital converter (ADC), enable the device to: wake up from a sleep mode; receive the plurality of digitized audio samples from the ADC; use a plurality of digitized audio samples as an input to an auxiliary neural network, wherein the auxiliary neural network determines where any audio activity is detected; and return to sleep mode if no audio activity is detected; and capture a plurality of additional digitized audio samples; use the plurality of additional digitized audio samples to create a spectrogram; provide the spectrogram as an input to a main neural network, wherein the main neural network comprises a plurality of outputs, where each output is a confidence level that the spectrogram contains a respective keyword. In certain embodiments, the main neural network is a convolutional neural network, comprising a convolutional stage and a fully connected stage, wherein the convolutional stage comprises one or more convolutional layers and the fully connected stage comprises one or more fully connected layers. In some embodiments, the auxiliary neural network comprises a fully connected neural network. In some embodiments, if audio activity is not detected, the processing unit returns to sleep mode in less than 1 milliseconds. In certain embodiments, the instructions to create the spectrogram enable the processing unit to: bin the plurality of additional digitized audio samples into one or more segments; perform a fast Fourier transform (FFT) of each of the one or more segments; perform Mel-cepstral conversion of the FFT for each segment to obtain Mel-cepstral information; and combine Mel-cepstral information from each segment to form the spectrogram. In other embodiments, the instructions to create the spectrogram enable the processing unit to: bin the plurality of additional digitized audio samples into one or more segments; perform a fast Fourier transform (FFT) of each of the one or more segments; perform averaging of the FFT for each segment to obtain spectral information; and combine spectral information from each segment to form the spectrogram. In certain embodiments, plurality of digitized audio samples comprises between 16 and 64 digitized audio samples. In certain embodiments, the plurality of additional digitized audio samples comprises at least 1000 digitized audio samples. In certain embodiments, the main neural network is trained using spectrograms containing keywords and truncated versions of the spectrograms.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
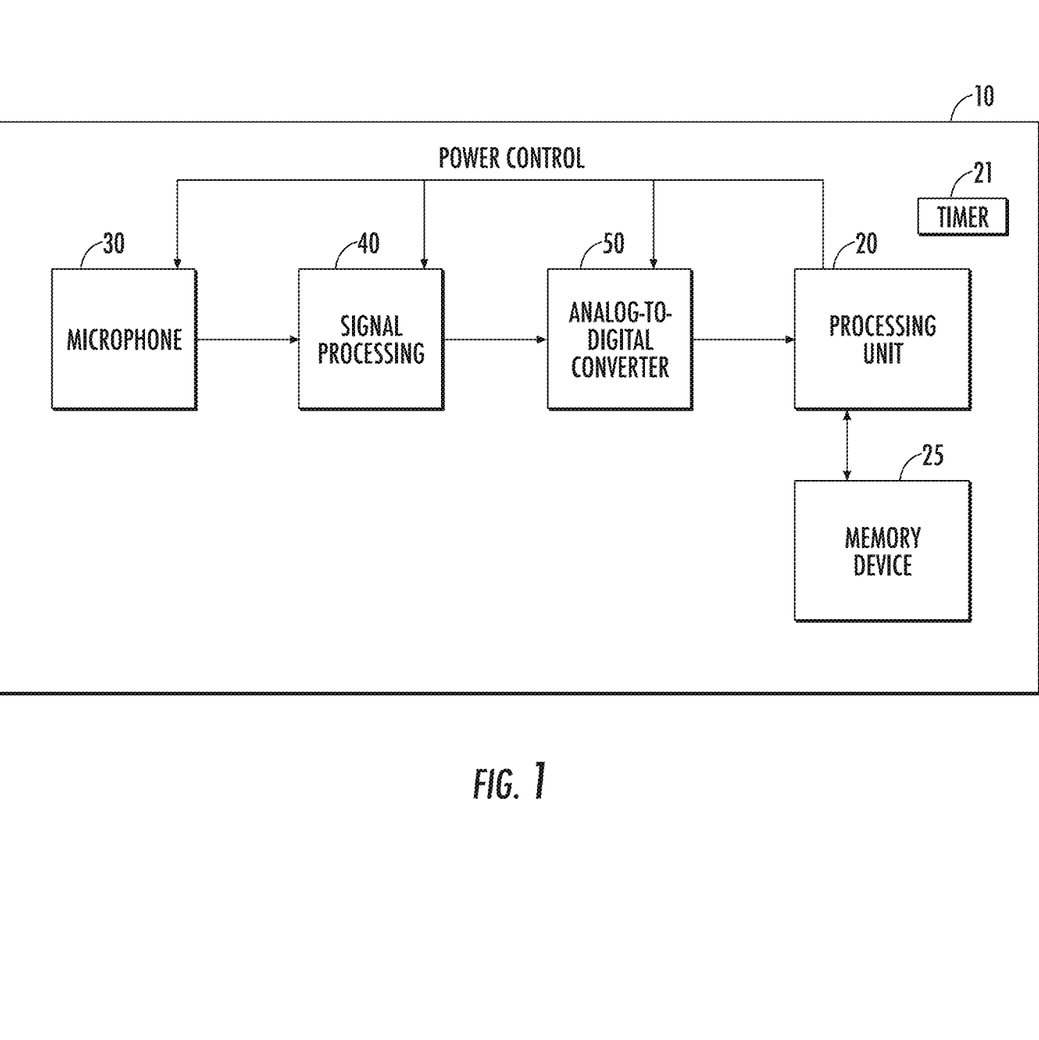
FIG. 1 is a block diagram of a device that may be used to perform the method described herein.

FIG. 1 shows a device that may be used to perform the keyword spotting technique described herein. The device 10 has a processing unit 20 and an associated memory device 25. The processing unit 20 may be any suitable component, such as a microprocessor, embedded processor, an application specific circuit, a programmable circuit, a microcontroller, or another similar device. In certain embodiments, the processing unit 20 may be a neural processor. In other embodiments, the processing unit 20 may include both a traditional processor and a neural processor. The memory device 25 contains the instructions, which, when executed by the processing unit 20, enable the device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media. In certain embodiments, the software environment may utilize standard libraries, such as Tensorflow and Keras.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the device 10. The instructions contained on this second computer readable non-transitory media may be downloaded onto the memory device 25 to allow execution of the instructions by the device 10.

The device 10 also includes a microphone 30. To minimize power consumption, the microphone 30 may be a micro-electro-mechanical system (MEMS) device. In other embodiments, the microphone 30 may be an analog device.

The microphone 30 may be in communication with a signal processing circuit 40. The signal processing circuit 40 may include amplifiers, filters, and other components to improve the quality of the output from the microphone 30. The output of the signal processing circuit 40 may be presented to an analog to digital converter (ADC) 50. The ADC 50 may have a sample rate of 16K samples per second, although other sample rates may be used as well. In other words, in one second, the ADC 50 will generate 16,000 digitized audio samples.

While the processing unit 20, the memory device 25, the microphone 30, the signal processing circuit 40 and the ADC 50 are shown in FIG. 1 as separate components, it is understood that some or all of these components may be integrated into a single electronic component. Rather, FIG. 1 is used to illustrate the functionality of the device 10, not its physical configuration.

Although not shown, the device 10 also has a power supply, which may be a battery or a connection to a permanent power source, such as a wall outlet.

The output of the ADC 50, which is referred to as the digitized audio sample 51, is an input to the processing unit 20. The processing unit 20 may operate on these digitized audio samples to determine whether a keyword has been transmitted, as described in more detail below.

The processing unit 20 utilizes two neural networks. The first neural network, referred to as the auxiliary neural network, is used to determine whether any audio activity is detected. The second neural network, referred to as the main neural network, is used to determine which keyword has been received. Because the auxiliary neural network only needs to make a binary decision regarding the detection of audio activity, it may be much less complex than the main neural network.

Figure 2:
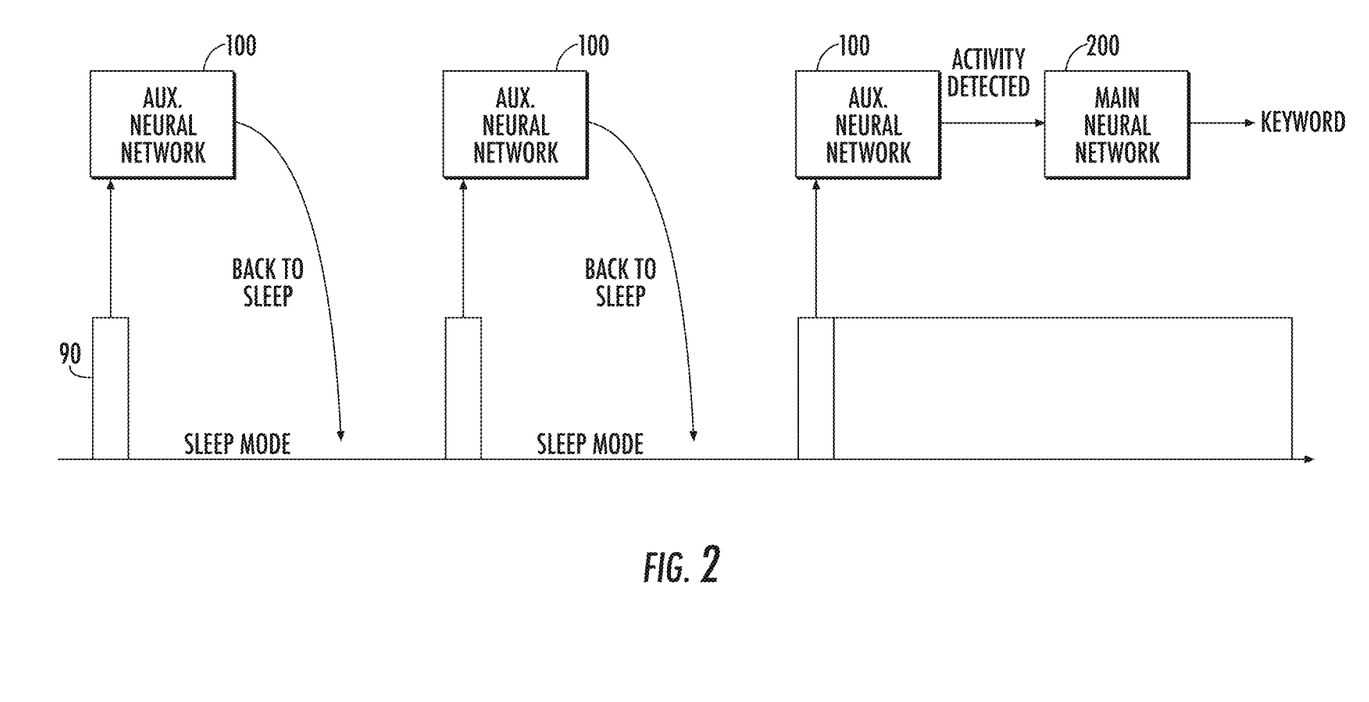
FIG. 2 is a timing diagram showing the operation of the device.

These two neural networks cooperate to detect keywords while seeking to minimize power consumption. FIG. 2 shows a timing diagram that shows the operation of the device 10. As the device 10 is typically battery powered, its default state is a sleep mode. In sleep mode, the processing unit 20 is in a low power state. Additionally, the ADC 50 may be powered off. In certain embodiments, the signal processing circuit 40 and/or the microphone 30 may also be powered off. In some embodiments, as shown in FIG. 1, the processing unit 20 controls the power supplied to one or more of the microphone 30, the signal processing circuit 40 and the ADC 50, such that the processing unit 20 can power down these components when in sleep mode. In other embodiments, less than all of these components are powered off in sleep mode, but their outputs are not monitored by the processing unit 20.

The processing unit 20 may utilize a wakeup timer 21 to wake the device 10 at regular intervals, such as every 100 milliseconds, although other intervals may be used. When the device 10 wakes, it enters active mode 90, powers on the microphone 30 and the ADC 50, and begins capturing digitized audio samples 51. These digitized audio samples 51 may be an input to the auxiliary neural network 100, which uses these digitized audio samples 51 to determine whether any audio activity is detected. In certain embodiments, the device 10 may capture digitized audio samples 51 during a certain time interval, such as between 1 and 4 milliseconds. Assuming a 16K sample rate, a total of between 16 and 64 digitized audio samples 51 may be generated and used as the input to the auxiliary neural network 100.

The auxiliary neural network 100 uses these digitized audio samples 51 to determine whether there is any audio activity. If the auxiliary neural network 100 does not detect any audio activity, the device 10 returns to sleep mode. Note that when audio activity is not detected, the device 10 may return to sleep mode within about 1 milliseconds after receipt of the last digitized audio sample.

This sequence repeats each time the wakeup timer 21 expires. In some embodiments, the wakeup timer 21 is set to a value of 500 milliseconds or less. In certain embodiments, the value may be between 25 and 250 milliseconds. Of course, other values may also be used. Eventually, the auxiliary neural network 100 may detect audio activity. In this scenario, the processing unit 20 remains in operational mode and continues collecting additional digitized audio samples 51. These additional digitized audio samples 51 are then further processed and used as the input to the main neural network 200. The main neural network 200 is then used to determine the keyword that was transmitted. Note that in this scenario, the processing unit 20 does not return to sleep mode. In certain embodiments, the main neural network 200 utilizes data spanning between 250 milliseconds and 2 seconds in duration.

Once the main neural network 200 identifies the keyword, the device 10 may execute some function associated with that keyword. The functions that may be performed by this device 10 are not limited by this disclosure. For example, the device 10 may perform a different function or activity for each keyword. The activities performed are a function of the device. For example, if the device is mobile, the keywords may be related to its motion, such as "go", "stop", "left", "right", "up", "down". If the device is used to control the power to another device, such as a light source, the keywords may include "on" and "off". In each case, the device would perform some function or activity based on the keyword.

Figure 3A:
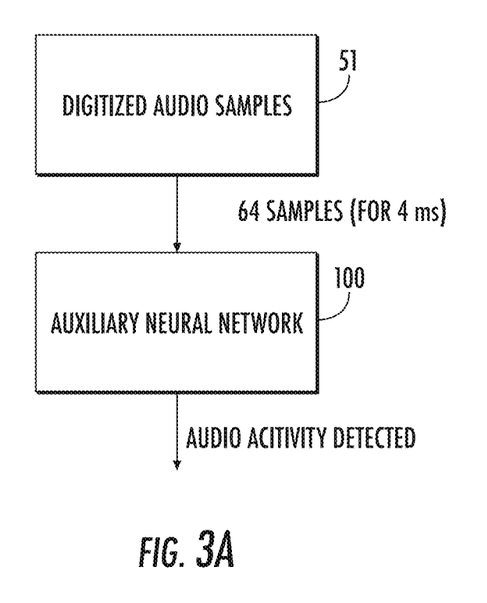
FIG. 3A is a diagram showing the operation of the auxiliary neural network.

FIG. 3A shows a diagram showing the operation of the auxiliary neural network 100. First, as described above, the digitized audio samples 51 from the ADC 50 are collected and used as input to the auxiliary neural network 100. As noted above, if the sample rate of the ADC 50 is 16K samples per second, there may be between 16 and 64 digitized audio samples (depending on the time duration used) that are passed to the auxiliary neural network 100.

Figure 3B:
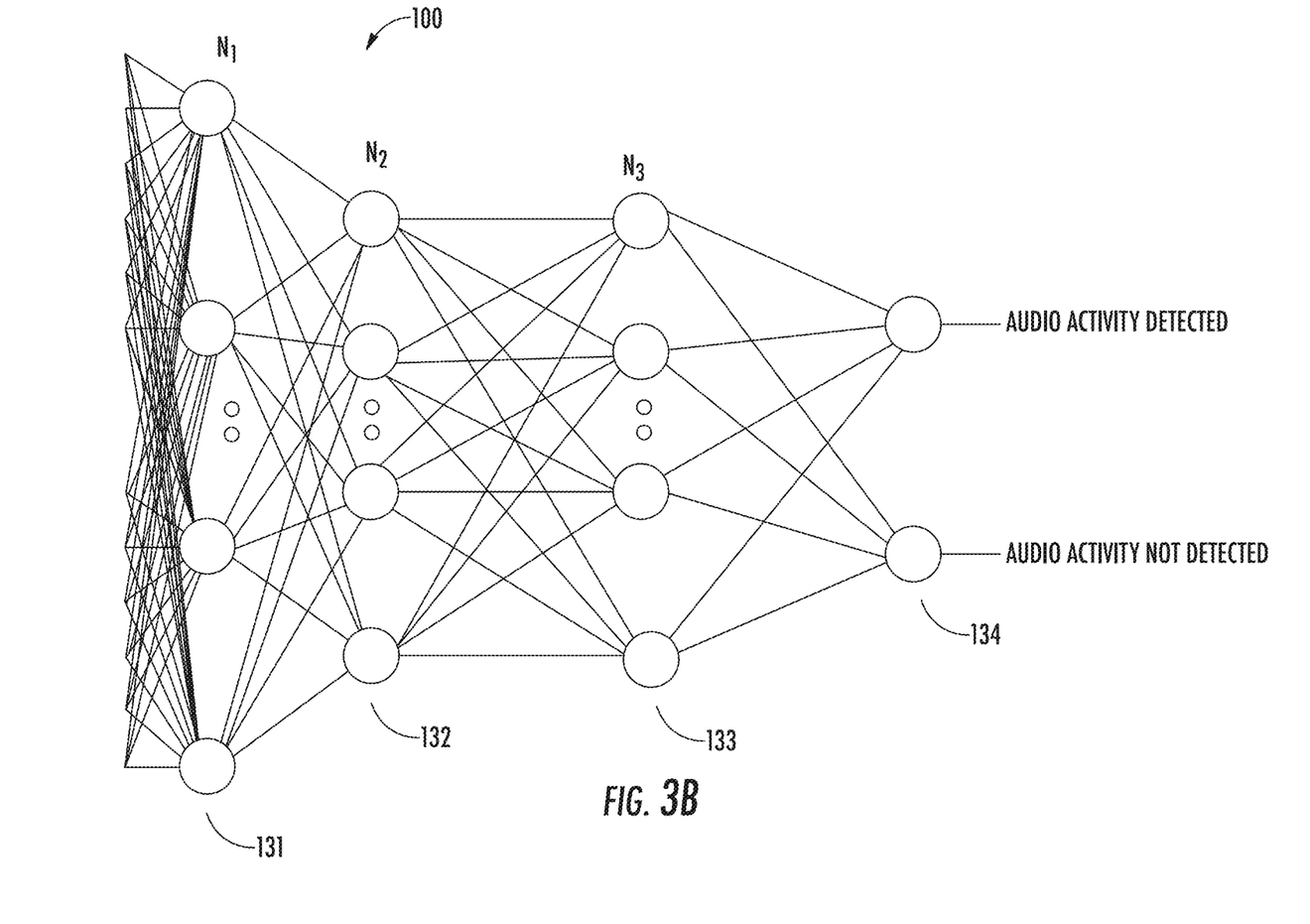
FIG. 3B shows the architecture of the auxiliary neural network according to one embodiment.

In one embodiment, the auxiliary neural network 100 may be a fully connected neural network comprising one or more layers. In one embodiment, as shown in FIG. 3B, the final layer 134 of the auxiliary neural network 100 comprises two neurons, which represent the confidence level of audio activity detection and the confidence level of a non-detection. In another embodiment, the final layer 134 may comprise only one neuron, which provides a single value indicative of the confidence that audio activity was detected. A plurality of fully connected layers 131, 132, 133 may precede this final layer. For example, in one embodiment, there may be three layers, comprising $N_1$, $N_2$ and $N_3$ neurons, respectively. In certain embodiments, the number of neurons in each layer may be a power of two. For example, in one specific embodiment, $N_1$ is 64, $N_2$ is 32 and $N_3$ is 16. Of course, the structure of the auxiliary neural network 100 may differ from this example.

The output or outputs of the auxiliary neural network 100 may be a binary value, indicative of whether any audio activity was detected. In other embodiments, the output or outputs of the auxiliary neural network 100 may be confidence levels that are used by the processing unit 20 to determine whether audio activity was detected.

In certain embodiments, the auxiliary neural network 100 is trained using snippets of audio, where each snippet is labelled as containing audio activity or not. In some embodiments, the term "audio activity" is used to denote the presence of any audio input. However, in other embodiments, the term "audio activity" is used to denote the presence of audio that is part of any of the recognized keywords. In this embodiment, the snippets are labelled as representing audio activity only if they contained at least part of one of the recognized keywords. The training data used determines how the auxiliary neural network 100 interprets the term "audio activity".

The output of the auxiliary neural network 100 is used by the processing unit 20 to determine whether to return to sleep mode, or to remain awake. If no audio activity is detected, the processing unit 20 restarts the wakeup timer 21 and remains to sleep mode. If audio activity is detected, the processing unit 20 continues collecting data for use by the main neural network 200.

Figure 4:
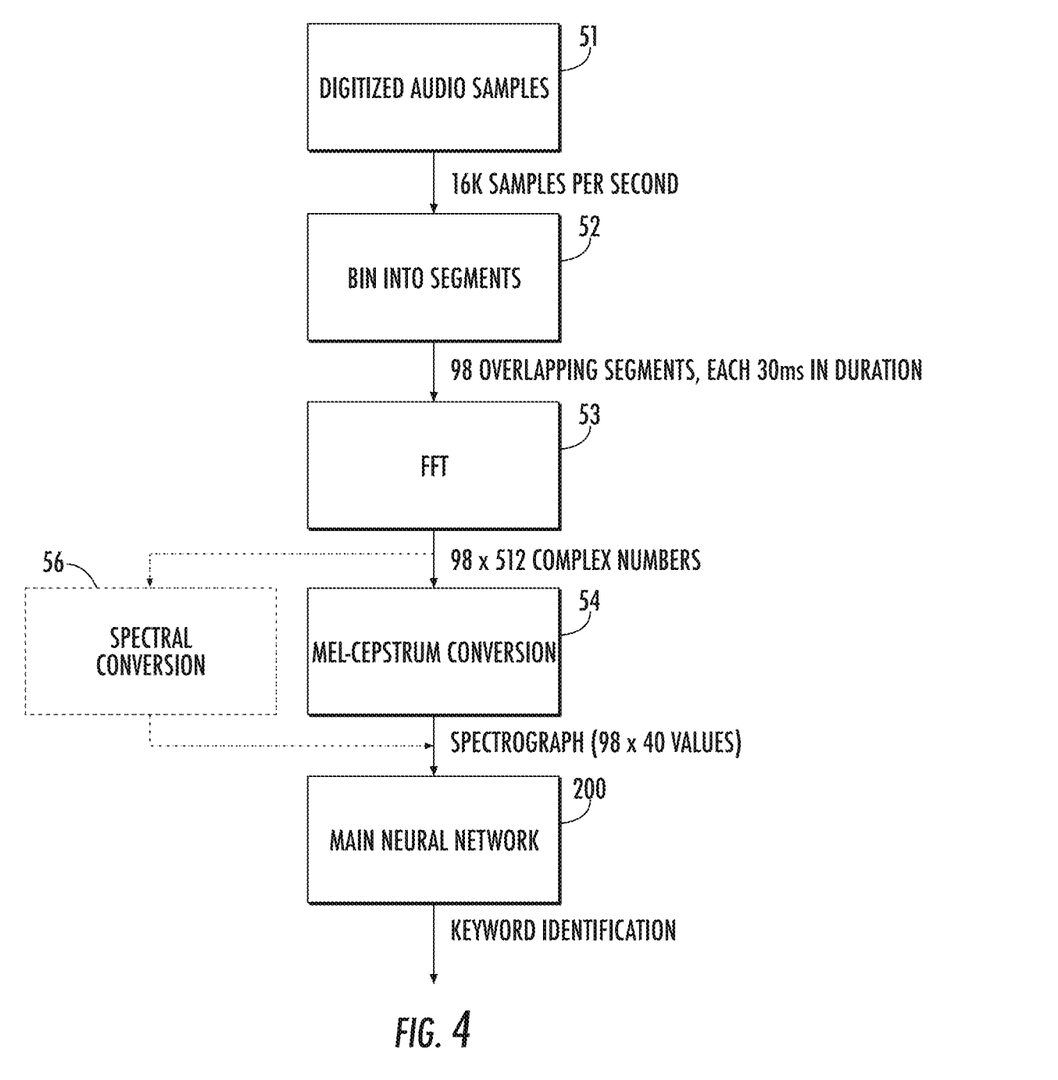
FIG. 4 is a diagram showing the operation of the main neural network.

FIG. 4 is a diagram showing the operation of the main neural network 200 according to one embodiment. First, as described above, the output from the ADC 50 represents digitized audio sample 51. In certain embodiments, additional digitized audio samples representing at least one second of data are captured. Assuming a sample rate of 16K samples per second, one second of data may comprises over 16000 additional digitized audio samples.

These additional digitized audio samples 51 are binned into a plurality of overlapping segments 52. For example, in certain embodiments, each segment may represent a duration of 30 milliseconds of data. Each segment is offset 10 milliseconds after the previous segment. In other words, the first segment contains data from time 0 to 30 milliseconds; the second segment contains data from time 10 milliseconds to 40 milliseconds; and so on. In this way, 98 segments may be created from one second of data. Of course, more or fewer segments may be created. Additionally, the offset and duration of the segments may be varied. For example, the offset between adjacent segments may be 10 to 20 milliseconds, while the duration of each segment may be between 20 and 60 milliseconds. Of course, other values may be used.

The processing unit 20 then performs a fast Fourier Transform (FFT) 53 on each of these segments. The output of the FFT 53 is a set of complex numbers where each complex number represents the amplitude and phase of a particular frequency. Specifically, the amplitude at a particular frequency is represented by the square root of the squares of the real and imaginary components. The phase of that particular frequency is given as the arctangent of the imaginary component divided by the real component. In certain embodiments, there are 512 frequencies that are analyzed. In other embodiments, more or fewer frequencies may be calculated.

The output from the FFT 53 is then used to create Mel-frequency cepstral scale information. This may be done by utilizing the output of the FFT 53 as the input to a set of overlapping triangular windows. In one embodiment, there may be 40 overlapping windows. In another embodiment, there may be 20 overlapping windows. Of course, other values may be used. The output from the Mel-cepstral conversion 54 is a set of values, where each value represents the power associated with a certain frequency range. In certain embodiments, there may be 40 values. In other embodiments, there may be 20 values. These outputs may be referred to as Mel-cepstral information. These frequency ranges are created based on a perceptual scale of pitches as judged by the human ear to be equidistant from one another. The result is that, at frequencies of about 1000 Hz and below, the Mel scale is approximately the same as the actually frequency. At higher actual frequencies, the resulting Mel frequency is typically lower than the actual frequency.

Alternatively, a Mel-frequency cepstral scale is not used. Rather, each value for the segment may be obtained by averaging one or more complex numbers output by the FFT 53. The outputs from the spectral conversion 56 may be a set of values, where each value represents a relative amplitude of a range of frequencies. These outputs may be referred to as spectral information. This may result in lower performance but may be simpler to implement.

Thus, after the processing described above, for 1 second of audio samples, there are 98 different segments, where each segment is represented by 40 values. This is referred to as a spectrogram 55. However, the spectrogram may differ in size. For example, a spectrogram may be generated every 500 milliseconds. In this case, there would be 49 bins, instead of 98. Additionally, the final output may be less than 40 values, as noted above. For example, in certain embodiments, the spectrogram may be of dimensions 49×20.

Figure 5:
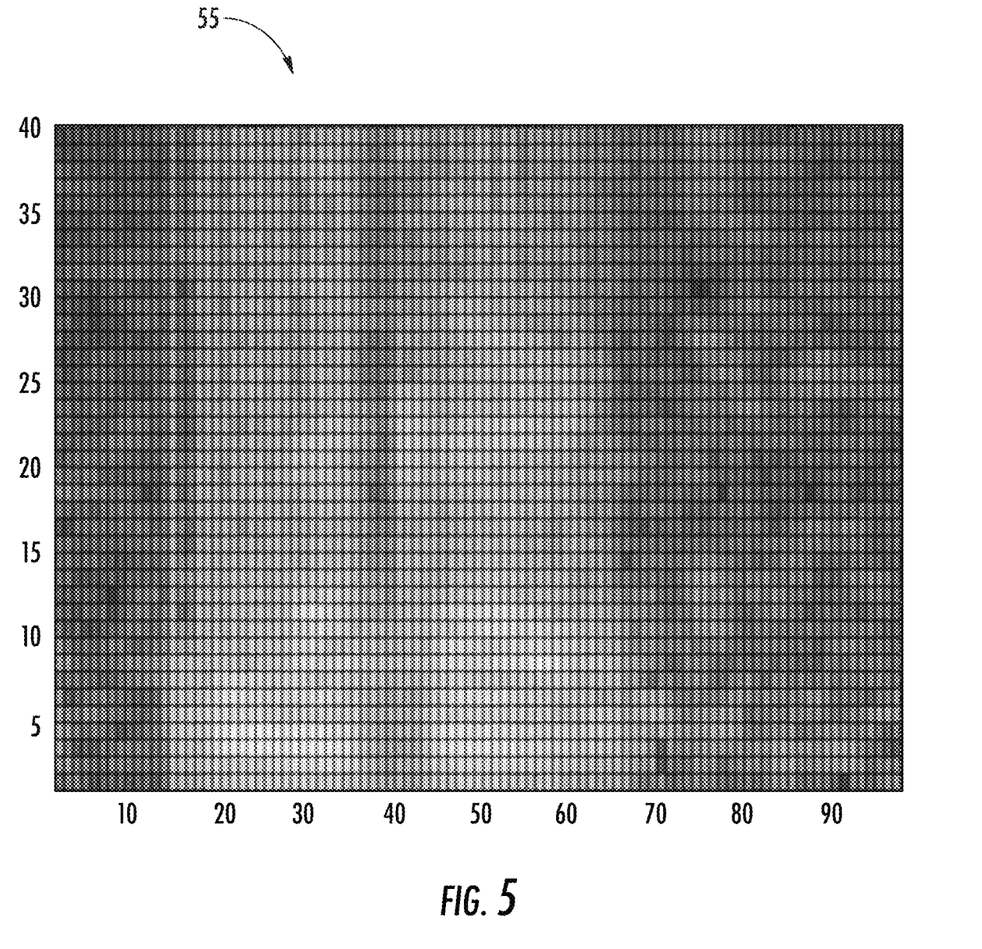
FIG. 5 shows a representative spectrogram.

FIG. 5 shows a pictorial representation of the results of the operations described above, where the color of each block of the spectrogram 55 is indicative of its value. This spectrogram 55 may be used as the input to the main neural network 200. As can be seen in FIG. 5, the x axis of the spectrogram represents the number of segments, while the y axis represents the Mel-cepstral values for that segment.

Figure 6:
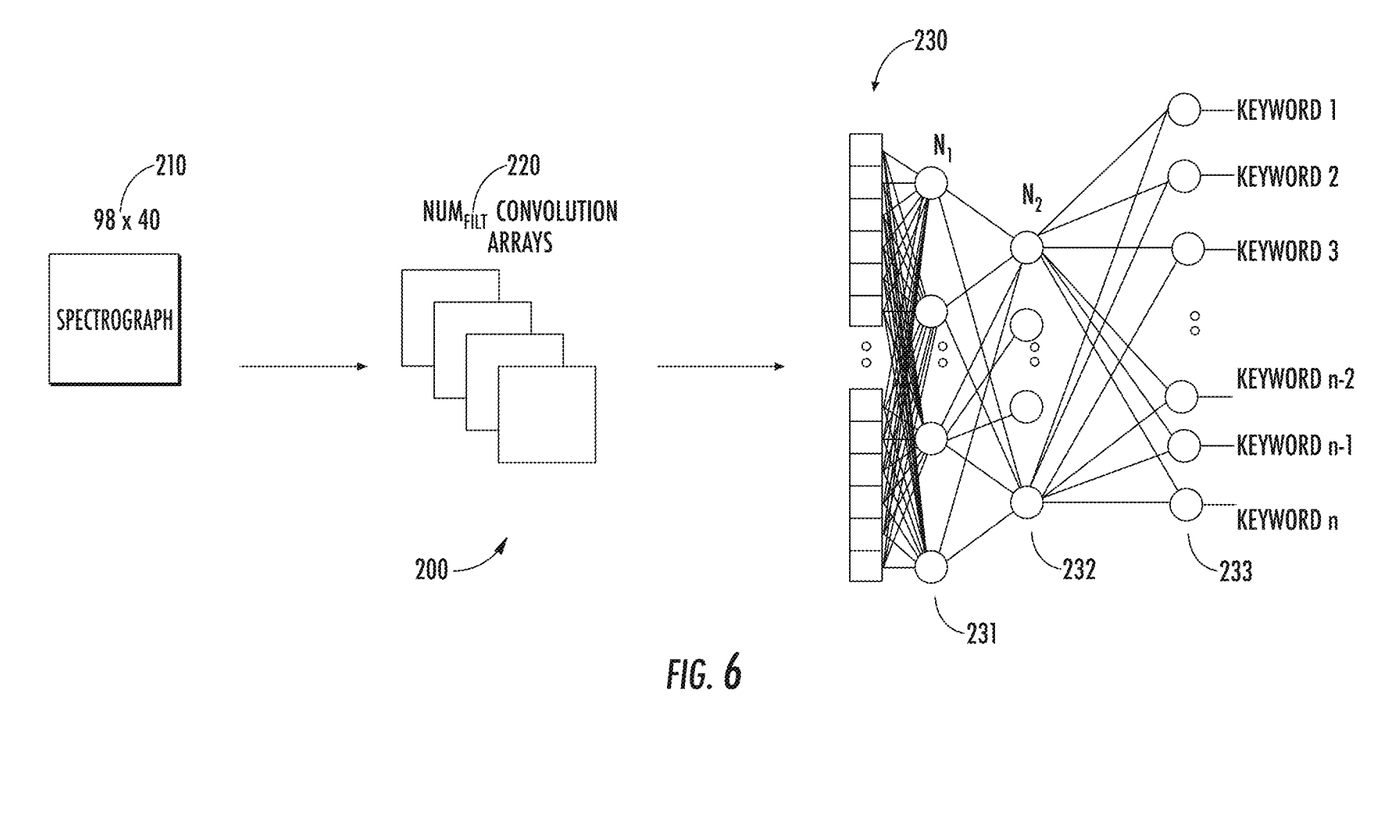
FIG. 6 shows the architecture of the main neural network according to one embodiment.

The main neural network 200 may be a convolutional neural network (CNN). FIG. 6 shows the structure of this CNN according to one embodiment.

The input stage 210 comprises the spectrogram 55 described above.

The spectrogram 55 is used as the input to a convolution stage 220. The convolution stage 220 comprises one or more convolution layers, wherein each layer convolves the spectrogram using a plurality of different filters. This plurality of different filters may be referred to as $Num_{filter}$. In certain embodiments, up to 64 filters are used in each convolution layer.

The dimension of the filter may be determined based on the dimension of the spectrogram. For example, the filters may be, for example, 2×2, or 3×3. Note that the filters need not be square. The convolution of the spectrogram 55 with each filter creates a new set of arrays, the dimension of which is determined based on the dimension of the filter and the spectrogram 55. In certain embodiments, the spectrogram 55 is padded prior to the convolution such that the new arrays have a dimension equal to the spectrogram 55.

In operation, the filter is used to operate on a portion of the spectrogram 55 having the same dimension as the filter. Typically, the operation is a dot product. The result of that operation is stored in the convolution array. For example, if the spectrogram 55 dimensioned as 98×40, and the filter is 3×3, the filter is first used to operate on elements (1,1), (1,2), (1,3), (2,1) and (2,2), (2,3), (3,1), (3,2), and (3,3) of the spectrogram 55. The result is stored in the convolution array at position (1,1). The filter is then moved to the right so as to operate on elements (1,2), (1,3), (1,4), (2,2), (2,3), (2,4), (3,2), (3,3) and (3,4) of the spectrogram 55. This continues until the last element in the row of the spectrogram 55 is reached. The process then repeats by stepping down one row and repeating the process. This is performed for each of the filter, resulting in $Num_{filt}$ convolution arrays. Thus, the result of a first convolution layer is a set of $Num_{filt}$ convolution arrays.

In certain embodiments, a regularization function is performed on all of the convolution arrays. In most embodiments, the regularization function simply replaces each element of each convolution array with 0 if the element was negative or leaves the element unchanged is it was positive. This may be referred to as a rectified linear unit or ReLU. In this way, the convolution arrays contain no negative values.

Thus, after this convolution layer, there are a total of $Num_{filt}$ convolution arrays. In certain embodiments, there may be a plurality of convolution layers. In this embodiment, each of these convolution arrays can then be used as inputs to a second convolution layer. In this second convolution layer, the convolution arrays generated by the first convolution layers are convoluted again. The size of the filters, the number of filters and the composition of those filters may be the same or different from those used in the first convolution layer.

This may be repeated a number of times. In this scenario, each convolution layer may be followed by a regularization function, and optionally a pooling function and/or a batch normalization function. Ultimately, the output from the convolution stage 220 is a set of final convolution arrays, which were created using the technique described above. In certain embodiments, five convolution layers are employed, although the number of convolution layers is not limited by this disclosure.

The output from the convolution stage 220 is an input to a fully connected stage 230. The fully connected stage 230 connects each of the inputs to each of $N_1$ neurons. Further, each connection between an element of the input and a neuron has an associated weight.

In certain embodiments, the value of $N_1$ may be a power of 2, such as 32, 64 or 128. Further, in certain embodiments, there may be multiple fully connected layers. For example, in FIG. 6, the first fully connected layer 231 has $N_1$ neurons. These $N_1$ neurons may be used as the inputs for the second fully connected layer 232, which has $N_2$ neurons, wherein $N_2 < N_1$. As described above, there will be $N_2 \times N_1$ connections, where each connection has an associated weight.

In certain embodiments, the result from the final fully connected layer 233 of the fully connected stage 230 will be outputs that represent the probability that the transmitted audio was one of the recognized keywords. In one embodiment, the final layer of the fully connected stage 230 has N outputs, where N represents the number of recognized keywords. Each output may represent a confidence level that the transmitted audio was that particular keyword. This confidence level may be a percentage or another normalized value. In certain embodiments, there may be N+1 outputs, where the final output provides the confidence that none of the keywords were transmitted.

While FIG. 6 shows a fully connected stage 230 having three fully connected layers, it is understood that there may be fewer or more fully connected layers.

The processing unit 20 may then examine the output from the main neural network 200 to determine the most likely keyword. In certain embodiment, the processing unit 20 simply selects the keyword with the highest confidence level. In other embodiments, the processing unit 20 may require that the confidence level is greater than a predetermined threshold. Based on the keyword, the processing unit may perform some function. As stated above, the function performed is not limited by this disclosure.

Figure 7:
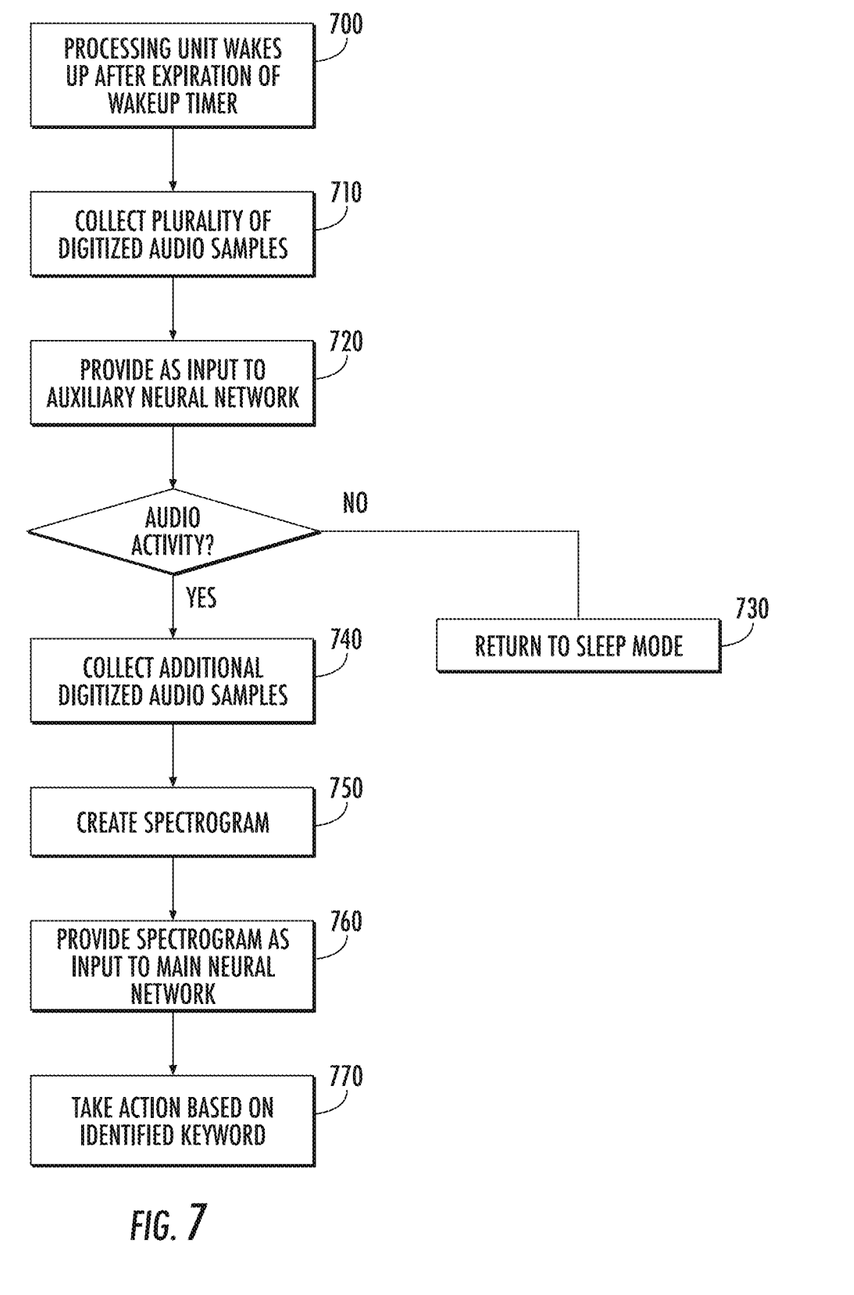
FIG. 7 shows the operation of the device after wakeup.

Thus, to summarize, as shown in FIG. 7, the device 10 wakes up when the wakeup timer expires, as shown in Box 700. When wakened, the processing unit 20 collects a plurality of digitized audio samples 51, as shown in Box 710. These digitized audio samples 51 may span between 1 and 4 milliseconds in duration, although other durations are possible. As shown in Box 720, the digitized audio samples 51 are then used as inputs to an auxiliary neural network 100, which determines whether audio activity has occurred. If audio activity is not detected, the processing unit 20 returns to sleep mode, as shown in Box 730. If audio activity is detected, additional digitized audio samples 51 are gathered, as shown in Box 740. These additional digitized audio samples 51 are used to create a spectrogram, as shown in Box 750. In one embodiment, the process of creating the spectrogram 55 is as follows:

The digitized audio samples 51 are binned into a plurality of segments, each segment having a fixed duration and offset from the previous segment by a predetermined offset.

The processing unit 20 then performs a FFT 53 on each segment.

The results of the FFT 53 are then converted to Mel-cepstral information.

A spectrogram 55 is created from the Mel-cepstral scale information from all of the segments.

The spectrogram 55 is then used as input to the main neural network 200, as shown in Box 760. This main neural network 200 may be a convolutional neural network having a convolution stage, having one or more convolution layers, and a fully connected stage, including one or more fully connected layers. The main neural network 200 then outputs a plurality of outputs where each output represented the confidence level that the transmitted audio contained one of the recognized keywords. The processing unit 20 may use these confidence levels to identify the keyword. The processing unit 20 may then perform some function or take some action based on the identified keyword, as shown in Box 770.

There are a number of variations of the above architectures.

In one alternative embodiment, the auxiliary neural network 100 may be a convolutional neural network comprising a convolution stage having one or more convolution layers, followed by one or more fully connected layers. The architecture of a representative convolution neural network is described in more detail above. Note that since the input to the auxiliary neural network 100 is a linear array, the convolution filters would likewise by one dimensional as well.

In another alternative embodiment, the input to the auxiliary neural network 100 may be a spectrogram. This spectrogram may be smaller than that used for the main neural network. For example, all of the digitized audio samples 51 may be in a single segment such that the resulting spectrogram has a dimension of between 1×10 and 1×20.

In another embodiment, these two concepts are combined and a spectrogram is supplied to an auxiliary neural network which is a convolutional neural network.

Additionally, it may be possible to accelerate the detection of the keyword. For example, the above example indicates that one second of audio is used to generate the spectrogram 55. After this one second, the spectrogram 55 is provided as input to the main neural network 200. However, in certain embodiments, the processes shown in FIG. 4 may be executed more frequently. For example, in one embodiment, the processing unit 20 may execute the steps shown in FIG. 4 every 100 milliseconds. Assuming a sample rate of 16K samples per second, this represents roughly 1600 digitized audio samples. In other embodiments, at least 1000 digitized audio samples are used.

In this example, after the first 100 milliseconds, 8 initial segments will have been binned. The FFT 53 for these initial segments is computed and the results are converted to Mel-cepstral information and incorporated into the spectrogram 55. Note that although the spectrogram may be 98×40, at this time, 90 of these columns will be unpopulated.

Each 100 milliseconds, ten new segments are created. The FFT 53 for these new segments is computed and the results are converted to Mel-cepstral information and added to the spectrogram. Thus, after 200 milliseconds, only 18 columns of the spectrogram 55 are populated. Every 100 milliseconds, ten more columns in the spectrogram 55 are populated until the entire spectrogram is filled in after 1 second.

Note that the above description is simply an example. For example, the spectrogram 55 may be updated at some other interval, which may be longer or shorter than 100 milliseconds. Further, the full spectrogram 55 need not be exactly 1 second. Rather, the spectrogram 55 may be longer or shorter in term of duration.

Having defined the structure of the main neural network 200, the neural network can then be trained. As is well known, machine learning systems may be trained using backpropagation algorithms. In these algorithms, data is input to the main neural network 200 and the output from the main neural network 200 is compared to the expected result. This difference or error, is then used to adjust the weights in the fully connected stage 230. The training is done by performing multiple iterations with each possible keyword.

Figure 8:
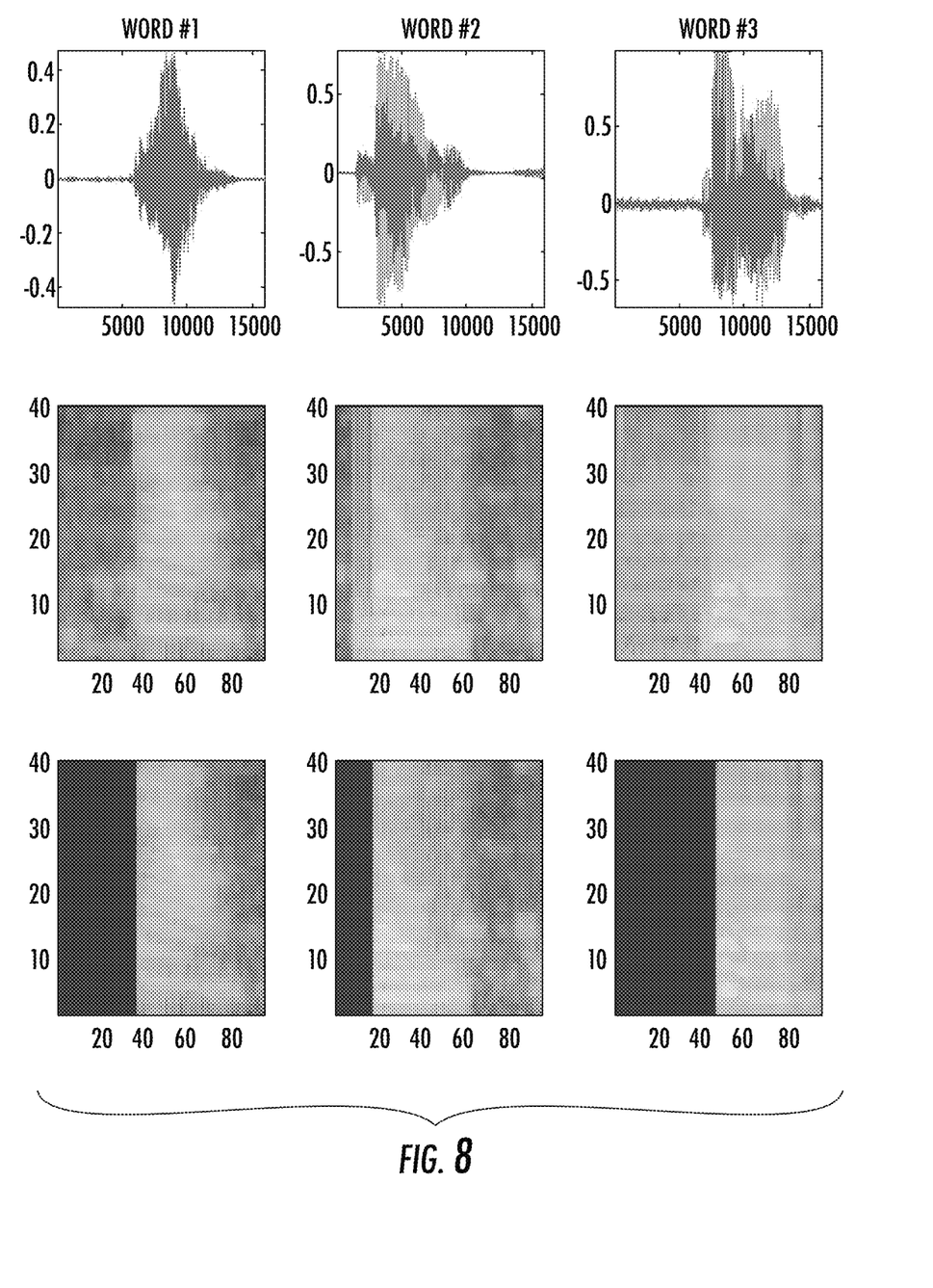
FIG. 8 shows representative training date for the main neural network.

The main neural network 200 is trained using normal spectrograms of each keyword. Additionally, the main neural network is trained using spectrograms having a random amount of truncation. This is done to simulate the situation where beginning of the keyword was spoken prior to the device being awaked. An example of this is shown in FIG. 8. The top row shows the time frequency representation of three words. The middle row shows the full spectrogram for each of these words. As described above, the spectrogram may have dimensions of 98×40. The bottom row shows the three spectrograms from the middle row, where each has been truncated by a random amount of time. The leftmost spectrogram is similar to the one above it, but has its beginning truncated by 40 milliseconds. The middle spectrogram is similar to the one above it, but has its beginning truncated by 20 milliseconds. The rightmost spectrogram is similar to the one above it, but has its beginning truncated by 50 milliseconds. Other spectrograms have different starting truncations may also be used. Thus, the main neural network 200 may be training using spectrograms containing keywords and truncated versions of these spectrograms.

Truncating the keywords allows the main neural network to generalize better in actual use. In some embodiments, instead of using a fixed dataset of truncated keywords, each spectrogram is truncated at run-time (during training) so that maximum generalization is accomplished.

The present system and method have many advantages. First, this approach allows the microphone and most of the device 10 to be placed in a very low power state most of the time. Further, the use of the auxiliary neural network allows the device 10 to only awaken for a brief period of time before returning to sleep mode in the event that there is no audio activity. Further, the auxiliary neural network may improve accuracy so that there are fewer false positives.

For comparison, in certain prior art configurations, an always-on microphone and comparator are used to detect audio activity. When the comparator detects audio activity, it wakes the rest of the system. However, this approach still utilizes more power than desired, since the microphone and comparator must always be on. Additionally, the accuracy of the comparator is much lower than that of the auxiliary neural network, resulting in missed keywords or false detections, which increase the power consumption further.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device for detecting one of a plurality of keywords, comprising:
   a microphone;
   a wakeup timer;
   an analog to digital converter (ADC) in communication with an output of the microphone to receive audio signals;
   a processing unit in communication with an output of the ADC to receive digitized audio samples from the ADC;
   a memory device, comprising instructions, which when executed by the processing unit, enable the device to:
   wake up from a sleep mode after expiration of the wakeup timer, wherein the microphone is in an off state during the sleep mode;
   receive a plurality of digitized audio samples from the ADC wherein the plurality of digitized samples is between 16 and 64 samples and all of the plurality of digitized samples are collected during a time interval that is less than or equal to 4 milliseconds;
   use the plurality of digitized audio samples as an input to an auxiliary neural network, wherein the auxiliary neural network determines where any audio activity is detected; and
   return to sleep mode if no audio activity is detected such that the processing unit returns to sleep mode and the microphone is turned off in less than 1 milliseconds; and
   capture a plurality of additional digitized audio samples only if audio activity is detected by the auxiliary neural network;
   use the plurality of additional digitized audio samples to create a spectrogram; and
   provide the spectrogram as an input to a main neural network, wherein the main neural network comprises a plurality of outputs, where each output is a confidence level that the spectrogram contains a respective keyword.

2. The device of claim 1, wherein the main neural network is a convolutional neural network, comprising a convolutional stage and a fully connected stage, wherein the convolutional stage comprises one or more convolutional layers and the fully connected stage comprises one or more fully connected layers.

3. The device of claim 1, wherein the auxiliary neural network comprises a fully connected neural network.

4. The device of claim 1, wherein the processing unit performs a function or activity based on the outputs from the main neural network.

5. The device of claim 1, wherein the wakeup timer is set to a value between 25 and 250 milliseconds.

6. The device of claim 1, wherein the instructions to create the spectrogram enable the processing unit to:
   bin the plurality of additional digitized audio samples into one or more segments;
   perform a fast Fourier transform (FFT) of each of the one or more segments;
   perform Mel-cepstral conversion of the FFT for each segment to obtain Mel-cepstral information; and
   combine Mel-cepstral information from each segment to form the spectrogram.

7. The device of claim 1, wherein the instructions to create the spectrogram enable the processing unit to:
   bin the plurality of additional digitized audio samples into one or more segments;
   perform a fast Fourier transform (FFT) of each of the one or more segments;
   perform averaging of the FFT for each segment to obtain spectral information; and
   combine spectral information from each segment to form the spectrogram.

8. The device of claim 1, wherein the plurality of additional digitized audio samples comprises at least 1000 digitized audio samples.

9. The device of claim 1, wherein the main neural network is trained using spectrograms containing keywords and truncated versions of the spectrograms.

10. The network device of claim 1, wherein a total time from when the network device wakes up from sleep mode after expiration of the wakeup timer to a time when the network device returns to sleep mode is less than 5 milliseconds when no audio activity is present.

11. A software program, disposed on a non-transitory storage media, comprising instructions, which when executed by a processing unit disposed on a device having a microphone, a wakeup timer and an analog to digital converter (ADC), enable the device to:
   wake up from a sleep mode after expiration of the wakeup timer, wherein the microphone is in an off state during the sleep mode;

receive a plurality of digitized audio samples from the ADC, wherein the plurality of digitized samples is between 16 and 64 samples and all of the plurality of digitized samples are collected during a time interval that is less than or equal to 4 milliseconds;

use the plurality of digitized audio samples as an input to an auxiliary neural network, wherein the auxiliary neural network determines where any audio activity is detected; and return to sleep mode if no audio activity is detected such that the processing unit returns to sleep mode and the microphone is turned off in less than 1 milliseconds; and capture a plurality of additional digitized audio samples only if audio activity is detected by the auxiliary neural network;

use the plurality of additional digitized audio samples to create a spectrogram; and provide the spectrogram as an input to a main neural network, wherein the main neural network comprises a plurality of outputs, where each output is a confidence level that the spectrogram contains a respective keyword.

12. The software program of claim 11, wherein the main neural network is a convolutional neural network, comprising a convolutional stage and a fully connected stage, wherein the convolutional stage comprises one or more convolutional layers and the fully connected stage comprises one or more fully connected layers.

13. The software program of claim 11, wherein the auxiliary neural network comprises a fully connected neural network.

14. The software program of claim 11, wherein the instructions to create the spectrogram enable the processing unit to:
bin the plurality of additional digitized audio samples into one or more segments;
perform a fast Fourier transform (FFT) of each of the one or more segments;
perform Mel-cepstral conversion of the FFT for each segment to obtain Mel-cepstral information; and
combine Mel-cepstral information from each segment to form the spectrogram.

15. The software program of claim 11, wherein the instructions to create the spectrogram enable the processing unit to:
bin the plurality of additional digitized audio samples into one or more segments;
perform a fast Fourier transform (FFT) of each of the one or more segments;
perform averaging of the FFT for each segment to obtain spectral information; and
combine spectral information from each segment to form the spectrogram.

16. The software program of claim 11, wherein the plurality of additional digitized audio samples comprises at least 1000 digitized audio samples.

17. The software program of claim 11, wherein the main neural network is trained using spectrograms containing keywords and truncated versions of the spectrograms.

18. The software program of claim 11, wherein a total time from when the device wakes up from sleep mode after expiration of the wakeup timer to a time when the network device returns to sleep mode is less than 5 milliseconds when no audio activity is present.

* * * * *